United States Patent
Saenger et al.

(10) Patent No.: US 7,675,815 B2
(45) Date of Patent: Mar. 9, 2010

(54) TIME REVERSE RESERVOIR LOCALIZATION

(75) Inventors: Erik Saenger, Zürich (CH); Brian Steiner, Zürich (CH); Stefan Schmalholz, Zürich (CH)

(73) Assignee: Spectraseis AG, Zurich (CH)

( * ) Notice: Subject to any disclaimer, the term of this patent is extended or adjusted under 35 U.S.C. 154(b) by 13 days.

(21) Appl. No.: 12/017,527

(22) Filed: Jan. 22, 2008

(65) Prior Publication Data

US 2008/0175101 A1    Jul. 24, 2008

Related U.S. Application Data

(60) Provisional application No. 60/911,283, filed on Apr. 12, 2007, provisional application No. 60/891,286, filed on Feb. 23, 2007, provisional application No. 60/885,887, filed on Jan. 20, 2007.

(51) Int. Cl.
*G01V 1/00* (2006.01)

(52) U.S. Cl. .................................................. 367/38

(58) Field of Classification Search ............. 367/37–39, 367/50, 51
See application file for complete search history.

(56) References Cited

U.S. PATENT DOCUMENTS

| | | | |
|---|---|---|---|
| 5,086,415 A | | 2/1992 | Takahashi et al. |
| 5,161,127 A | | 11/1992 | Grosch |
| 5,274,605 A | * | 12/1993 | Hill ............................. 367/53 |
| 5,377,104 A | | 12/1994 | Sorrells et al. |
| 5,805,098 A | | 9/1998 | McCorkle |
| 5,812,493 A | * | 9/1998 | Robein et al. ................. 367/25 |
| 6,442,489 B1 | | 8/2002 | Gendelman et al. |
| 6,466,873 B2 | | 10/2002 | Ren et al. |
| 6,529,833 B2 | * | 3/2003 | Fanini et al. ................... 702/7 |
| 6,999,377 B2 | | 2/2006 | Burkholder et al. |
| 7,388,811 B2 | | 6/2008 | Meunier et al. |
| 2003/0076740 A1 | | 4/2003 | Calvert |
| 2005/0117452 A1 | | 6/2005 | Calvert |
| 2008/0120037 A1 | * | 5/2008 | Duren et al. .................. 702/17 |
| 2008/0137478 A1 | * | 6/2008 | Sollner ......................... 367/51 |
| 2008/0288173 A1 | * | 11/2008 | Saenger ....................... 702/16 |

OTHER PUBLICATIONS

Gajewski et al., "Imaging of passive sources by reverse modeling", EAGE 67th Conference & Technical Exhibition, Jun. 13-16, 2005.*
Gajewski et al. "Imaging of Passive Seismic Sources by Reverse Modeling", EAGE 67th Conference & Technology Exhibition, Jun. 2005.*

(Continued)

*Primary Examiner*—Jack W. Keith
*Assistant Examiner*—Krystine Saito

(57) ABSTRACT

A method and system for processing synchronous array seismic data includes acquiring synchronous passive seismic data from a plurality of sensors to obtain synchronized array measurements. A reverse-time data process is applied to the synchronized array measurements to obtain a plurality of dynamic particle parameters associated with subsurface locations. These dynamic particle parameters are stored in a form for display. Maximum values of the dynamic particle parameters may be interpreted as reservoir locations. The dynamic particle parameters may be particle displacement values, particle velocity values, particle acceleration values or particle pressure values. The sensors may be three-component sensors. Zero-phase frequency filtering of different ranges of interest may be applied. The data may be resampled to facilitate efficient data processing.

7 Claims, 8 Drawing Sheets

OTHER PUBLICATIONS

Mathias Fink, Time-reversal acoustics in complex environments, Geophysics, vol. 71, No. 4 Jul.-Aug. 2006; p. SI151-SI164, 15 Figs. 10.1190/1.2215356.

Kees Wapenaar and Jacob Fokkema, Seismic Interferometry, Time-Reversal and Reciprocity, G031, EAGE 67th Conference & Exhibition—Madrid, Spain, Jun. 13-16, 2005.

D. Gajewski and E. Tessmer, Imaging of Passive Seismic Sources by Reverse Modelling, C021, EAGE 67th Conference & Technical Exhibition—Madrid, Spain, Jun. 13-16, 2005.

Susanne Rentsch, Stefan Buske, Stefan Lüth and Serge A. Shapiro, Passive Seismic Monitoring Using a Migration Technique, C023, EAGE 67th Conference & Exhibition—Madrid, Spain, Jun. 13-16, 2005.

Stewart A. Levin, Principle of Reverse-Time Migration, Geophysics, vol. 49, No. 5, (May 1984), p. 581-583.

Zuccarello et al., Localization of volcanic tremor using array analysis and amplitude distribution, Geophysical Research Abstracts, vol. 8, 03461, 2006, European Geosciences Union 2006.

Anthony R. Lowry, Resonant slow fault slip in subduction zones forced by climatic load stress, Nature, (0 2006| doi:10.1038/nature05055). 2006.

Langer et al., A new Technique for Volcanic Tremor Location during the 2004 Lava Effusion at Mt. Etna, Italy, Geophysical Research Abstracts, vol. 7, 06617, 2005. SRef-ID: 1607-7962/gra/EGU05-A-06617, European Geosciences Union 2005.

Curtis et al., Seismic interferometry—turning noise into signal, The Leading Edge, vol. 25, p. 1082-1092 (Sep. 2006).

Mufti et al., Finite-difference depth migration of exploration-scale 3-D seismic data, Geophysics, vol. 61, No. 3 (May-Jun. 1996); p. 776-794.

Yoon et al., Reverse-time migration using the Poynting vector, Exploration Geophysics (2006) 37, 102-107.

Saenger et al., Modeling the propagation of elastic waves using a modified finite-difference grid, Wave Motion, vol. 31, (2000) p. 77-92.

Coates et al., Finite-difference modeling of faults and fractures, Geophysics, vol. 60, No. 5 (Sep.-Oct. 1995); p. 1514-1526.

Miller et al., Multichannel analysis of surface waves to map bedrock, The Leading Edge, Dec. 1999, p. 1392-1396.

Shragge et al., Teleseismic shot-profile migration, Geophysics, vol. 71, No. 4 Jul.-Aug. 2006; p. SI221-SI229, 8 Figs., 1Table. 10.1190/1.2208263.

Brad Artman, Imaging passive seismic data, Geophysics, vol. 71, No. 4 Jul.-Aug. 2006; p. SI177-SI187, 14 Figs., 2Tables. 10.1190/1.2209748.

Gajewski and Tessmer, Reverse modelling for seismic event characterization, Geophys. J. Int. (2005) 163, 276-284. doi: 10.1111/j.1365-246X.2005.02732.x.

* cited by examiner

⊕ Receivers
······· Reservoir
------- Basement

TIME REVERSE RESERVOIR LOCALIZATION

CROSS-REFERENCE TO RELATED APPLICATION

This application claims the benefit of U.S. Provisional Application No. 60/885,887 filed 20 Jan. 2007, U.S. Provisional Application No. 60/891,286 filed 23 Feb. 2007 and U.S. Provisional Application No. 60/911,283 filed 12 Apr. 2007.

BACKGROUND OF THE DISCLOSURE

1. Technical Field

The disclosure is related to seismic exploration for oil and gas, and more particularly to determination of the positions of subsurface reservoirs.

2. Description

Expensive geophysical and geological exploration investment for hydrocarbons is often focused on acquiring data in the most promising areas using relatively slow methods, such as reflection seismic data acquisition and processing. The acquired data are used for mapping potential hydrocarbon-bearing areas within a survey area to optimize exploratory or production well locations and to minimize costly non-productive wells.

The time from mineral discovery to production may be shortened if the total time required to evaluate and explore a survey area can be reduced by applying geophysical methods alone or in combination. Some methods may be used as a standalone decision tool for oil and gas development decisions when no other data is available.

Geophysical and geological methods are used to maximize production after reservoir discovery as well. Reservoirs are analyzed using time lapse surveys (i.e. repeat applications of geophysical methods over time) to understand reservoir changes during production. The process of exploring for and exploiting subsurface hydrocarbon reservoirs is often costly and inefficient because operators have imperfect information from geophysical and geological characteristics about reservoir locations. Furthermore, a reservoir's characteristics may change as it is produced.

The impact of oil exploration methods on the environment may be reduced by using low-impact methods and/or by narrowing the scope of methods requiring an active source, including reflection seismic and electromagnetic surveying methods. Various geophysical data acquisition methods have a relatively low impact on field survey areas. Low-impact methods include gravity and magnetic surveys that maybe used to enrich or corroborate structural images and/or integrate with other geophysical data, such as reflection seismic data, to delineate hydrocarbon-bearing zones within promising formations and clarify ambiguities in lower quality data, e.g. where geological or near-surface conditions reduce the effectiveness of reflection seismic methods.

SUMMARY

A method and system for processing synchronous array seismic data includes acquiring synchronous passive seismic data from a plurality of sensors to obtain synchronized array measurements. A reverse-time data process is applied to the synchronized array measurements to obtain a plurality of dynamic particle parameters associated with subsurface locations. These dynamic particle parameters are stored in a form for display. Maximum values of the dynamic particle parameters may be interpreted as reservoir locations. The dynamic particle parameters may be particle displacement values, particle velocity values, particle acceleration values or particle pressure values. The sensors may be three-component sensors. Zero-phase frequency filtering of different ranges of interest may be applied. The data may be resampled to facilitate efficient data processing.

DETAILED DESCRIPTION

Figure 1:
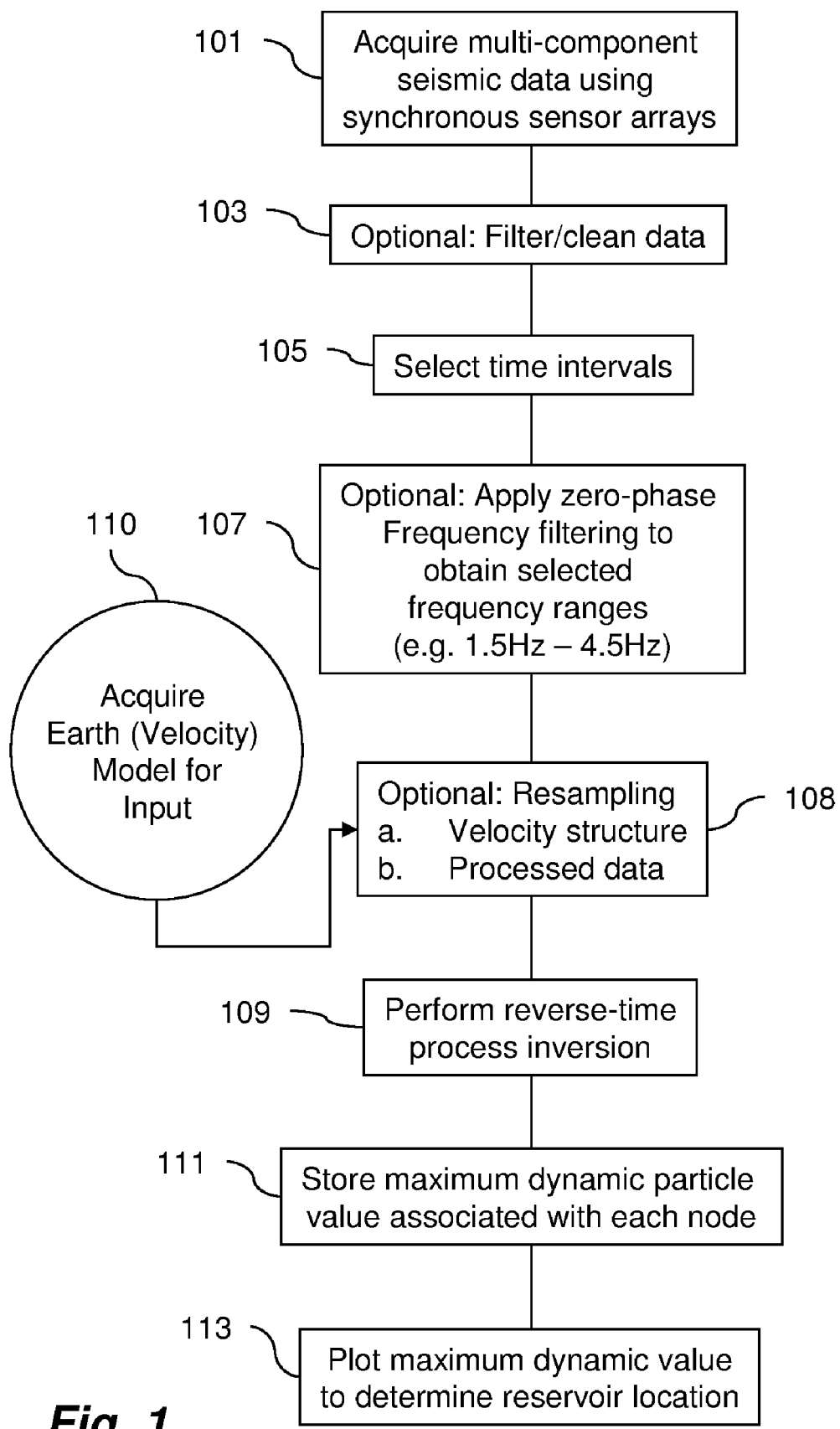
FIG. 1 is a schematic illustration of a method according to an embodiment of the present disclosure for calculating maximum values for subsurface locations from continuous synchronous signals.

Information to determine the location of hydrocarbon reservoirs may be extracted from naturally occurring seismic waves and vibrations measured at the earth's surface using passive seismic data acquisition methods. Seismic wave energy emanating from subsurface reservoirs, or otherwise altered by subsurface reservoirs, is detected by arrays of sensors and the energy back-propagated with reverse-time processing methods to locate the source of the energy disturbance. An inversion methodology for locating positions of subsurface reservoirs may be based on various time reversal processing algorithms of time series measurements of passive seismic data.

Passive seismic data acquisition methods rely on seismic energy from sources not directly associated with the data acquisition. In passive seismic monitoring there may be no actively controlled and triggered source. Examples of sources recorded that may be recorded with passive seismic acquisition are microseisms (e.g., rhythmically and persistently recurring low-energy earth tremors), microtremors and other ambient or localized seismic energy sources.

Microtremors are attributed to the background energy normally present in the earth. Microtremor seismic waves may include sustained seismic signals within various or limited frequency ranges. Microtremor signals, like all seismic waves, contain information affecting spectral signature characteristics due to the media or environment that the seismic waves traverse as well as the source of the seismic energy. These naturally occurring and often relatively low frequency background seismic waves (sometimes termed noise or hum) of the earth may be generated from a variety of sources, some of which may be unknown or indeterminate.

Characteristics of microtremor seismic waves in the "infrasonic" range may contain relevant information for direct detection of subsurface properties including the detection of fluid reservoirs. The term infrasonic may refer to sound waves below the frequencies of sound audible to humans, and nominally includes frequencies under 20 Hz.

Synchronous arrays of sensors are used to measure vertical and horizontal components of motion due to background seismic waves at multiple locations within a survey area. The sensors measure orthogonal components of motion simultaneously.

Local acquisition conditions within a geophysical survey may affect acquired data results. Acquisition conditions impacting acquired signals may change over time and may be diurnal. Other acquisition conditions are related to the near sensor environment. These conditions may be accounted for during data reduction.

The sensor equipment for measuring seismic waves may be any type of seismometer for measuring particle dynamics, such as particle displacements or derivatives of displacements. Seismometer equipment having a large dynamic range and enhanced sensitivity compared with other transducers, particularly in low frequency ranges, may provide optimum results (e.g., multicomponent earthquake seismometers or equipment with similar capabilities). A number of commercially available sensors utilizing different technologies may be used, e.g. a balanced force feed-back instrument or an electrochemical sensor. An instrument with high sensitivity at very low frequencies and good coupling with the earth enhances the efficacy of the method.

Noise conditions representative of seismic waves that may have not traversed or been affected by subsurface reservoirs can negatively affect the recorded data. Techniques for removing unwanted noise and artifacts and artificial signals from the data, such as cultural and industrial noise, are important where ambient noise is relatively high compared with desired signal energy.

Time-reverse data processing may be used to localize relatively weak seismic events or energy, for example if a reservoir acts as an energy source or significantly affects acoustic energy traversing the reservoir. The seismograms measured at a synchronous array of sensor stations are reversed in time and used as boundary values for the reverse processing. Time-reverse data processing is able to track down event or energy sources for an S/N-ratio lower than one.

Field surveys have shown that hydrocarbon reservoirs may act as a source of low frequency seismic waves and these signals are sometimes termed "hydrocarbon microtremors." The frequency ranges of microtremors have been reported between ~1 Hz to 6 Hz or greater. A direct and efficient detection of hydrocarbon reservoirs is of central interest for the development of new oil or gas fields. One approach is to apply a time-reverse processing/migration. If there is a steady source origin (or other alteration) of low-frequency seismic waves within a reservoir, the location of the reservoir may be located using time reverse migration and may also be used to locate and differentiate stacked reservoirs.

Time reverse processing (or migration) of acquired seismic data, which may be in conjunction with modeling, using a grid of nodes is an effective tool to detect the locality of a steady origin of low-frequency seismic waves. As a non-limiting example for the purposes of illustration, microtremors may comprise low-frequency signals with a fundamental frequency of about 3 Hz and a range between 1.5 Hz and 4.5 Hz. Hydrocarbon affected seismic data that include microtremors may have differing values that are reservoir or case specific. Snapshots (images of an inversion representing one or more time steps) showing a current dynamic particle motion value (e.g., displacement, velocity, acceleration or pressure) at every grid point may be produced at specific time steps during the reverse-time signal processing. Data for nodes representing high or maximum particle velocity values indicate the location of a specific source (or a location related to seismic energy source aberration) of the forward or field acquired data. The maximum velocities obtained from the reverse-time data processing may be used to delineate parameters associated with the subsurface reservoir location.

There are many known methods for a reverse-time data process for seismic wave field imaging with Earth parameters from inversions of acquired seismic data. For example, finite-difference, ray-tracing and pseudo-spectral computations, in two- and three-dimensional space, are used for full or partial wave field simulations and imaging of seismic data. Reverse-time migration algorithms may be based on finite-difference, ray-tracing or pseudo-spectral wave field extrapolators. Output from these reverse-time data processing routines may include amplitudes for displacement, velocity, acceleration or pressures values at every time steps of the inversion.

FIG. 1 illustrates a method according to a non-limiting embodiment of the present disclosure that includes using passively acquired seismic data to determine a subsurface location for hydrocarbons or other reservoir fluids. The embodiment, which may include one or more of the following (in any order), includes acquiring synchronous array seismic data having a plurality of components 101. The acquired data from each sensor station may be time stamped and include multiple data vectors. An example is passive seismic data, such as multicomponent seismometry data from "earthquake" type sensors. The multiple data vectors may each be associated with an orthogonal direction of movement. Data may be acquired as orthogonal component vectors. The vector data may be arbitrarily mapped or assigned to any coordinate reference system, for example designated east, north and depth (e.g., respectively, Ve, Vn and Vz) or designated $V_x$, $V_y$, and $V_z$ according to any desired convention and is amenable to any coordinate system.

Figure 2:
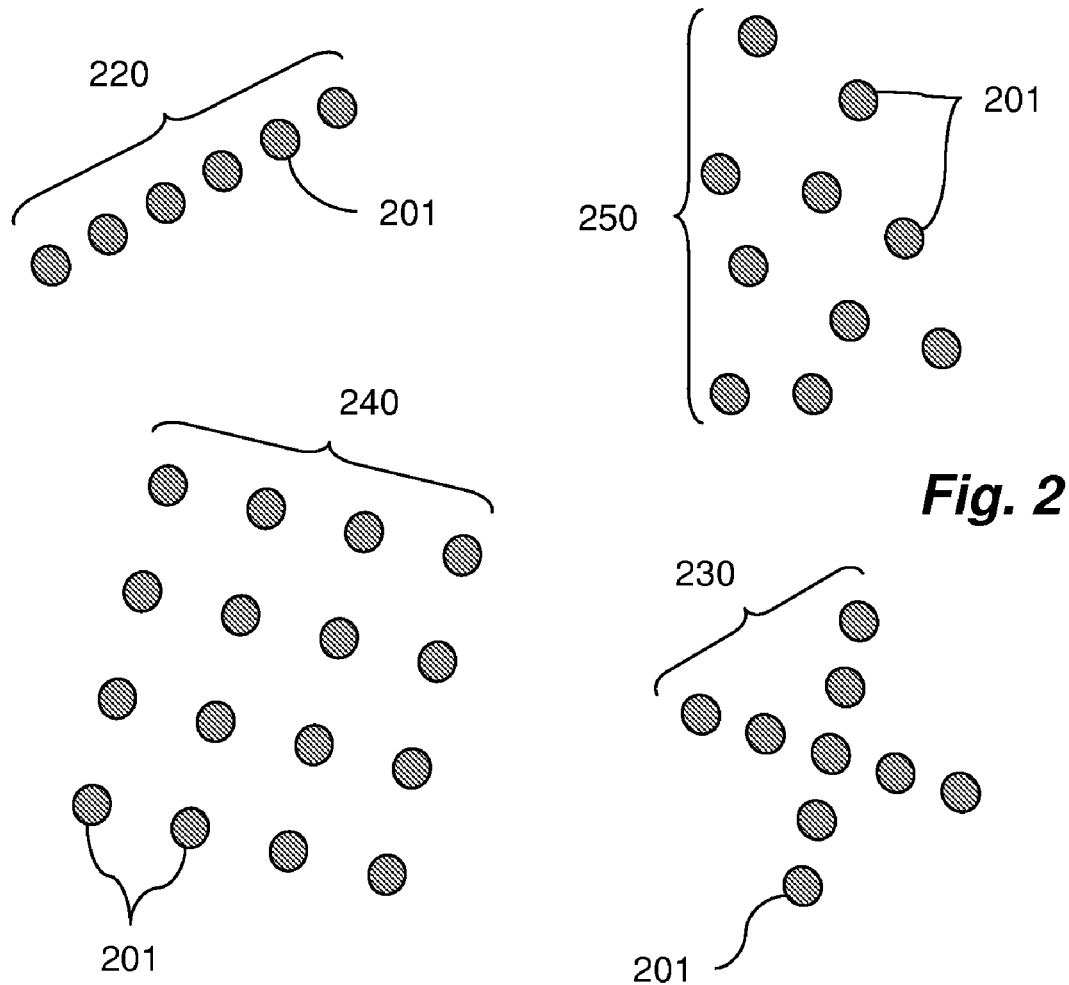
FIG. 2 illustrates various non-limiting possibilities for arrays of sensor for data acquisition of synchronous signals.

Data may be acquired with arrays, which may be 2D or 3D, or even arbitrarily positioned sensors 201 as illustrated in FIG. 2. FIG. 2 illustrates various acquisition geometries which may be selected based on operational considerations. Array 220 is a 2D array and while illustrated with regularly spaced sensors 201, regular distribution is not a requirement. Array 230 and 240 are example illustrations of 3D arrays. Sensor distribution 250 could be considered an array of arbitrarily placed sensors and may even provide for some modification of possible spatial aliasing that can occur with regular spaced sensor 201 acquisition arrays.

While data may be acquired with multi-component earthquake seismometer equipment with large dynamic range and enhanced sensitivity, many different types of sensor instruments can be used with different underlying technologies and varying sensitivities. Sensor positioning during recording may vary, e.g. sensors may be positioned on the ground, below the surface or in a borehole. The sensor may be positioned on a tripod or rock-pad. Sensors may be enclosed in a protective housing for ocean bottom placement. Wherever sensors are positioned, good coupling results in better data. Recording time may vary, e.g. from minutes to hours or days. In general terms, longer-term measurements may be helpful in areas where there is high ambient noise and provide extended periods of data with fewer noise problems.

The layout of a data survey may be varied, e.g. measurement locations may be close together or spaced widely apart and different locations may be occupied for acquiring measurements consecutively or simultaneously. Simultaneous recording of a plurality of locations (a sensor array) may provide for relative consistency in environmental conditions that may be helpful in ameliorating problematic or localized ambient noise not related to subsurface characteristics of interest. Additionally the array may provide signal differentiation advantages due to commonalities and differences in the recorded signal.

Returning to FIG. 1, the data may be optionally conditioned or cleaned as necessary 103 to account for unwanted noise or signal interference. For example various processing steps such as offset removal, detrending the signal and band pass or other targeted frequency filtering. The vector data may be divided into selected time windows 105 for processing. The length of time windows for analysis may be chosen to accommodate processing or operational concerns.

If a preferred or known range of frequencies for which a hydrocarbon signature is known or expected, an optional frequency filter (e.g., zero phase, Fourier of other wavelet type) may be applied 107 to condition the data for processing. Examples of basis functions for filtering or other processing operations include without limitation the classic Fourier transform or one of the many Continuous Wavelet Transforms (CWT) or Discreet Wavelet Transforms. Examples of other transforms include Haar transforms, Haademard transforms and Wavelet Transforms. The Morlet wavelet is an example of a wavelet transform that often may be beneficially applied to seismic data. Wavelet transforms have the attractive property that the corresponding expansion may be differentiable term by term when the seismic trace is smooth.

Additionally, signal analysis, filtering, and suppressing unwanted signal artifacts may be carried out efficiently using transforms applied to the acquired data signals. Additionally the data may be resampled 108 to facilitate more efficient processing.

The earth velocity model or velocity structure, which may be developed from predetermined subsurface velocity information, for use with the reverse-time processing may be input to the work flow at virtually any point, but is illustrated here as an example. The velocity model may be resampled to facilitate data processing as well.

Inverting field-acquired passive seismic data to determine the location of subsurface reservoirs includes using the acquired time-series data as 'sources' in reverse-time processing 109. The output of the reverse-time processing includes a measure of the dynamic particle motion of sources associated with subsurface positions (which may be nodes of mathematical descriptions (i.e., models) of the earth). The maximum values derived from dynamic particle motion, which may be displacements, velocities or accelerations, may be collected 111 to determine the energy source location contributing to the dynamics. Plotting the maximum dynamic values 113 from all the measurement values output from a reverse-time process may provide a basis for interpreting the location of a subsurface reservoir. The amplitude values associated with subsurface locations having the highest relative values may indicate the position of a reservoir that is the source of hydrocarbon tremors (for example FIG. 7). An alternative to checking and storing an updated maximum for every backward time step is to sum together all the values calculated for each time step or subsurface position. The data, whether maximum values or summed values, may be contoured or otherwise graphically displayed to illuminate reservoir positions (for example 90 in FIG. 8*b* and 92 and 94 in FIG. 8*c*).

Figure 3:
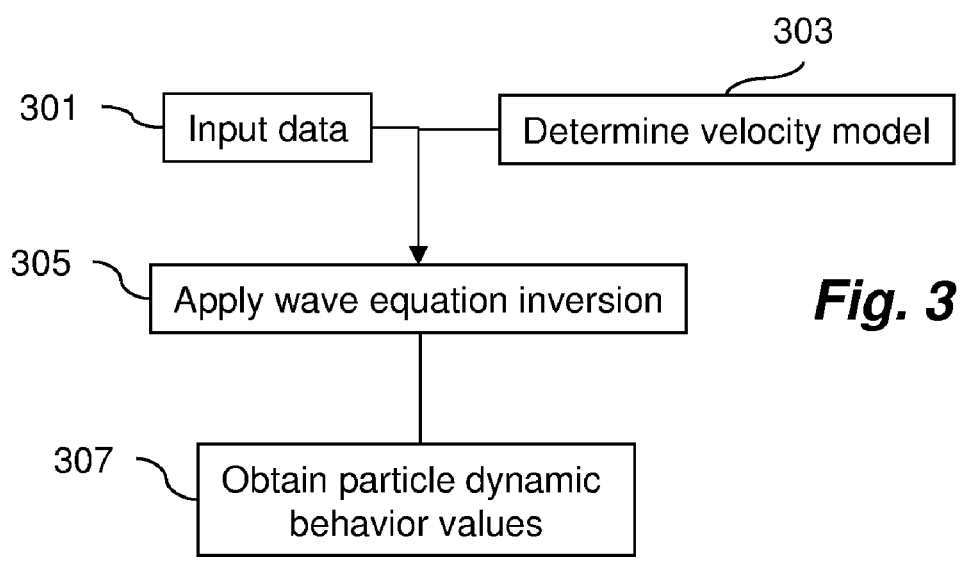
FIG. 3 is a flow chart of reverse-time processing for application to seismic data.

A non-limiting example of a reverse-time processing inversion is illustrated in FIG. 3 wherein data are input 301 to the processing flow. The data may optionally be filtered to a selected frequency range. A velocity model for the reverse-time process may be determined from known information 303 or estimated. A wave-equation reverse-time inversion is performed 305 to obtain particle dynamic behavior 307.

The reverse-time inversion process may include development of an earth model that may be based on a priori knowledge or estimates of a survey area of interest. During data preparation, the forward modeling inversion may be useful for anticipating and accounting for known seismic signal or refining the velocity field used for the reverse time processing. Modeling may include accounting for, or the removal of, the near sensor signal contributions due to environmental field effects, unwanted signal and noise and, thus, the isolation of those parts of signals believed to be associated with environmental components being examined. By adapting or filtering the data between successive iterations in the inversion process, predicted signal can be obtained, thus allowing convergence to a structure element indicating whether a reservoir is present within the subsurface.

One embodiment for determining reservoir location includes acquiring synchronous passive seismic data as continuous (digital or analog) signals acquired with arrays of seismometers. Seismic data parameters are determined from the acquired data.

Figure 4:
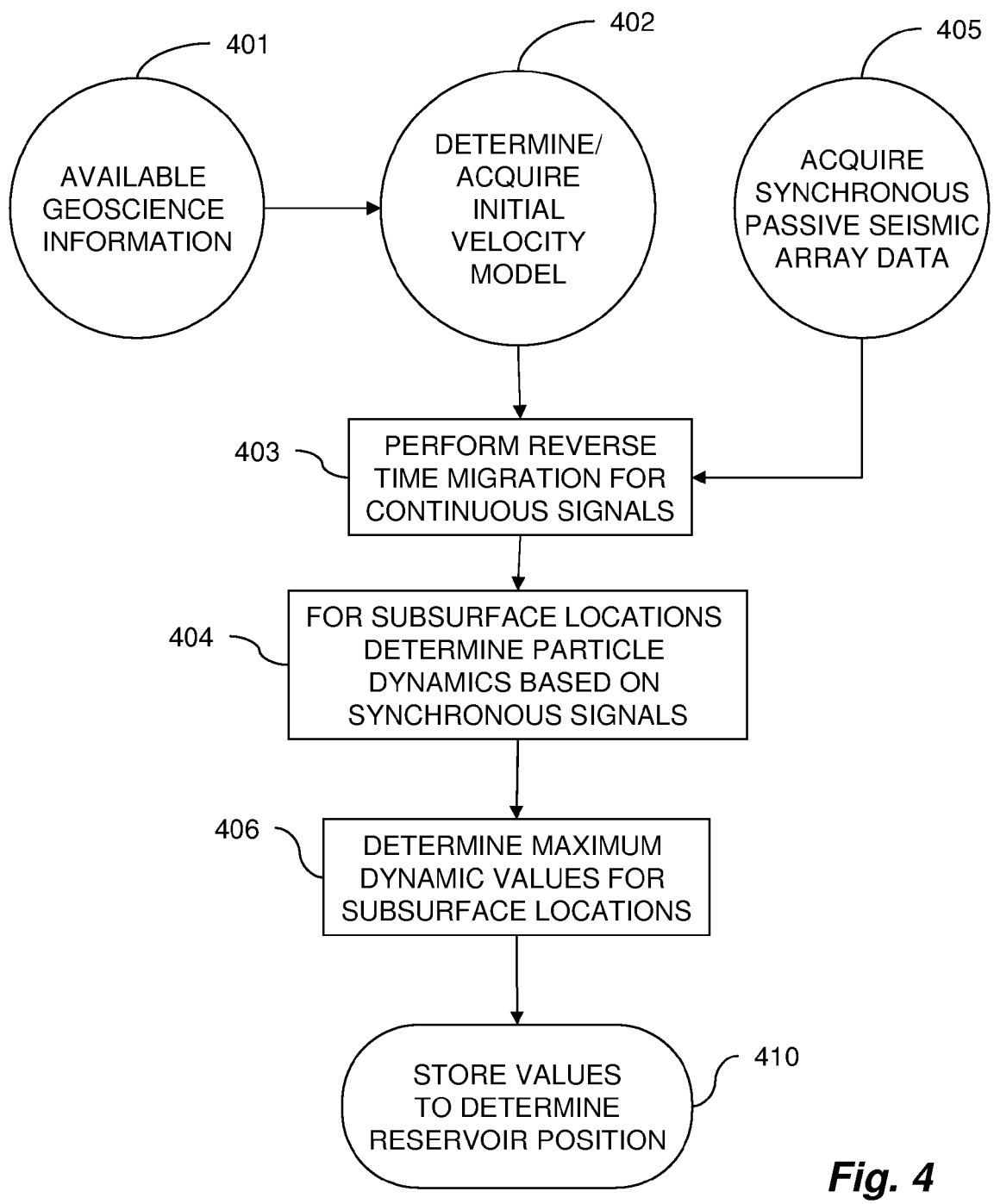
FIG. 4 is a flow chart of a data processing flow that includes acquiring or determining a velocity model associated with reverse-time processing of field data.

FIG. 4 illustrates an example of a reverse-time process inversion for locating a reservoir in the subsurface using a velocity model 402 as input for a reverse-time migration of continuous signals. The reverse time migration may be wave equation based. Any available geosciences information 401 may be used as input to determine parameters for an initial model 402 that may be modified as input to a reverse-time data process for continuous signals 403 as more information is available or determined. Synchronously acquired passive seismic data 405 are input (after any optional processing/conditioning) to the reverse-time data process 403. Particle dynamics such as displacement, velocity or acceleration (or pressure) are determined from the processed data for determining dynamic particle behaviour 404. Maximum values may be determined 406 and stored 410 to determine subsurface reservoir positions.

The maximum amplitude values associated with the dynamic particle behavior, such as velocity values, represent the location of sources of hydrocarbon tremors. Unlike prior art time-reverse methods, there is no specific time associated with the source, since the tremor as the source is a continuous function unlike discrete seismic events. Not only the tremor source may be located, but noise sources not related to tremor sources may be differentiated as well.

An example of an embodiment illustrated here uses a numerical modeling algorithm similar to the rotated staggered grid finite-difference technique described by Saenger et al. (2000). The two dimensional numerical grid is rectangular. Computations may be performed with second order spatial explicit finite difference operators and with a second order time update. However, as will be well known by practitioners familiar with the art, many different reverse-time methods may be used along with various wave equation approaches. Extending methods to three dimensions is straightforward.

For one non-limiting illustrative example used herein, a model data set rather than acquired data are input. The grid of the mathematical model contains 901 horizontal and 301 vertical nodal points with an interval of 10 m in both directions. The model setup is similar to the geological situation illustrated in FIG. 5. For simplicity each model unit is homogeneous and isotropic, though there is no limit on the potential complexity of the situation. There are ten different nonplanar sediment model units with P-wave velocities increasing from 1200 m/s (top layer) stepwise by 200 m/s up to 3000 m/s (bottom layer). The velocity is defined by varying Young's Modulus and a constant density of 2000 kg/m$^3$ is applied for all sediment units. The crystalline basement model unit is defined by a density of 3000 kg/m$^3$ and a Young's Modulus of $1.08*10^{11}$ N/m$^2$ resulting in a P-wave velocity of 6000 m/s. The lower part of the model is cut by a zone 501 with a density of 2000 kg/m$^3$ and a Young's Modulus of $8*10^9$ N/m$^2$ resulting in a P-wave velocity of 2000 m/s. The reservoirs (Reservoir 1 and Reservoir 2) with a thickness of about 50 m and a lateral extension of about 2000 m are positioned close to the middle of the model domain. The reservoirs have a density of 2000 kg/m$^3$ and a Young's Modulus of $1.25*10^{10}$ N/m$^2$ resulting in a P-wave velocity of 2500 m/s. All S-wave velocities are a multiple of approximately 1.4 smaller than the corresponding P-wave velocity.

Figure 5:
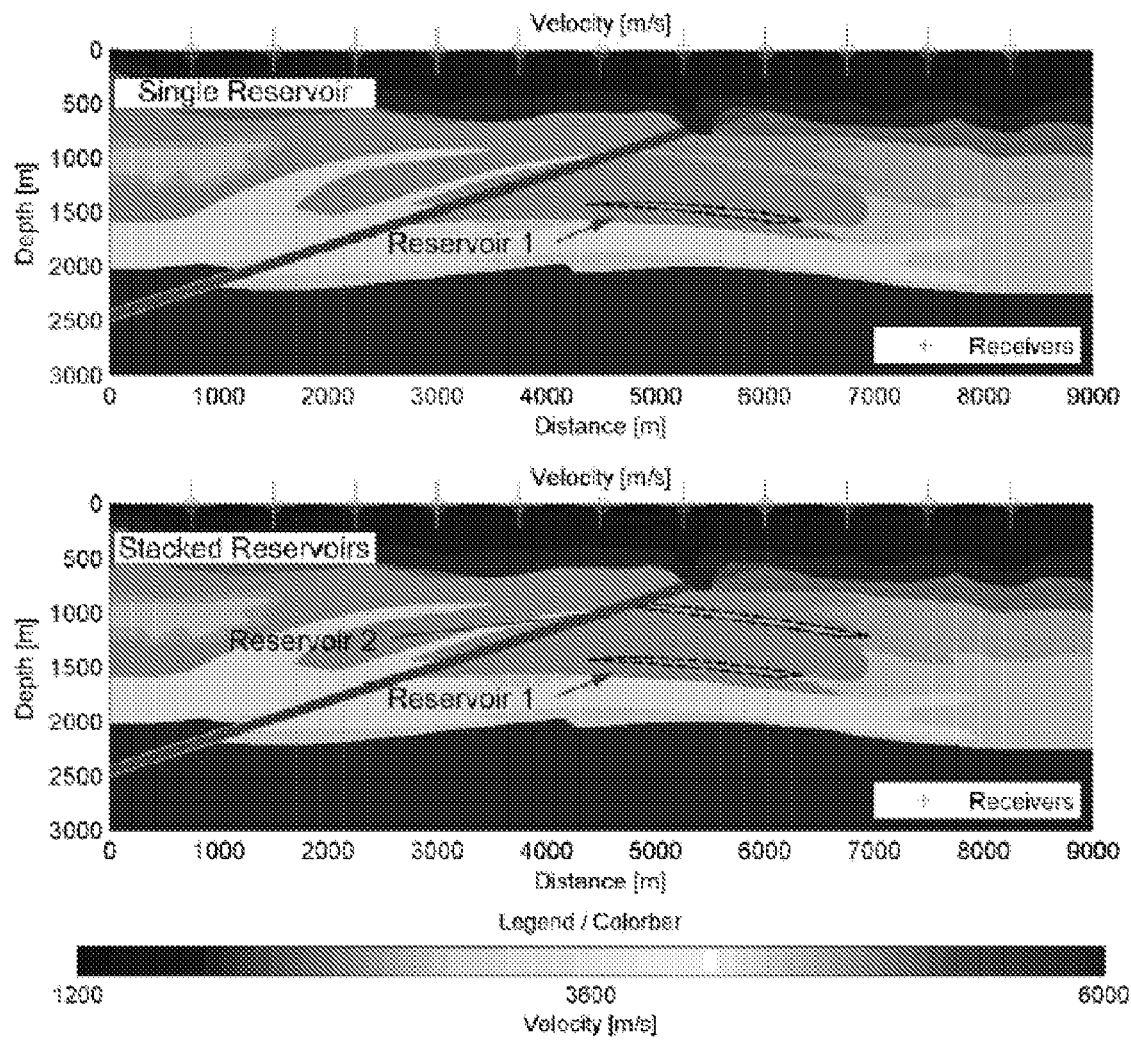
FIG. 5 illustrates a model setup for determining a synthetic velocity model.

FIG. 5 consists of ten sediment units and a basement unit. The lower parts of both models are separated from the tops by a zone with a P-wave velocity of 2000 m/s. For the top model one reservoir, Reservoir 1, defines seismic source area. The second model includes two source areas (Reservoir 1 and Reservoir 2) as represented by two stacked reservoirs.

Figure 6:
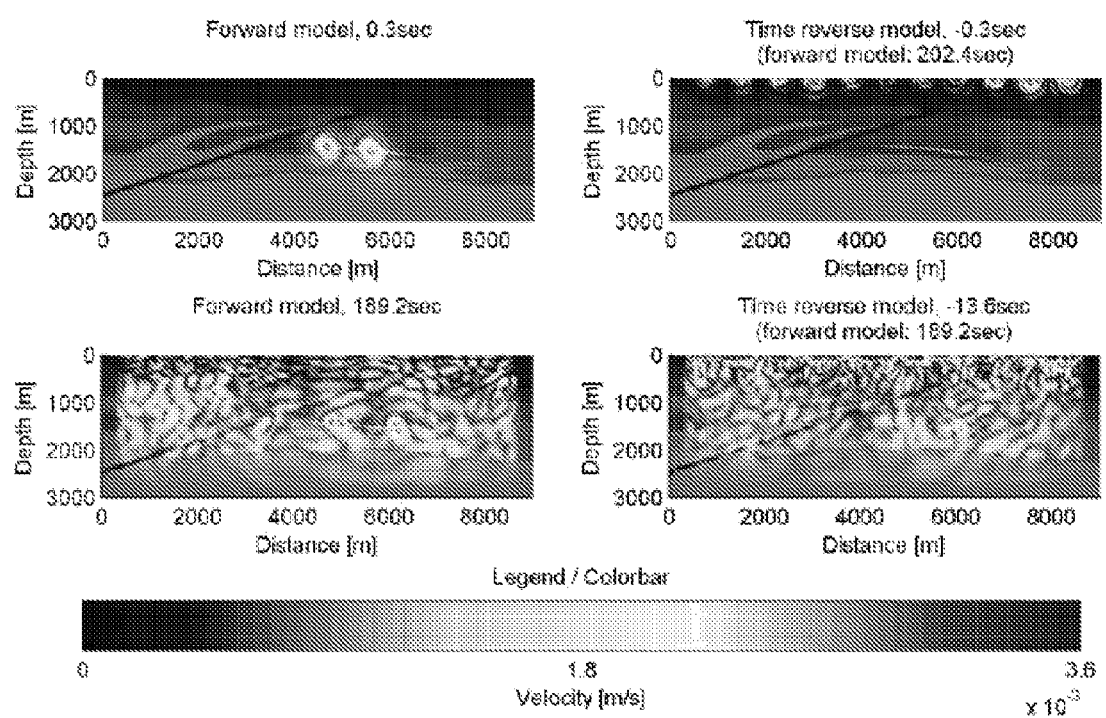
FIG. 6 illustrates snapshots in time of reverse-time and forward-time processing for comparison.

A time-reverse inversion may be conducted for the each of the FIG. 5 cases, one for the single reservoir case (top model) and another time-reverse inversion may be conducted for the two stacked reservoirs case (bottom model). Snapshots as illustrated in FIG. 6 during the reverse processing show an accumulation of high velocities in the vicinity of the sources which were applied in the forward model. Any apparent inaccuracy near the surface is, as discussed by Gajewski et al. (2005), considerably small because the error of maximal 100 m is much smaller than the wavelength of the waves at the central frequency. FIG. 6 illustrate the forward model (left column corresponding to field data) and time reverse inversion (right column) for the single reservoir model. The top figures show the first steps of both simulations. The bottom figures correspond to the same time. The microtremors with a known source from the forward data (such as field acquired data) are visible in the time reverse (lower right) model.

Figure 7:
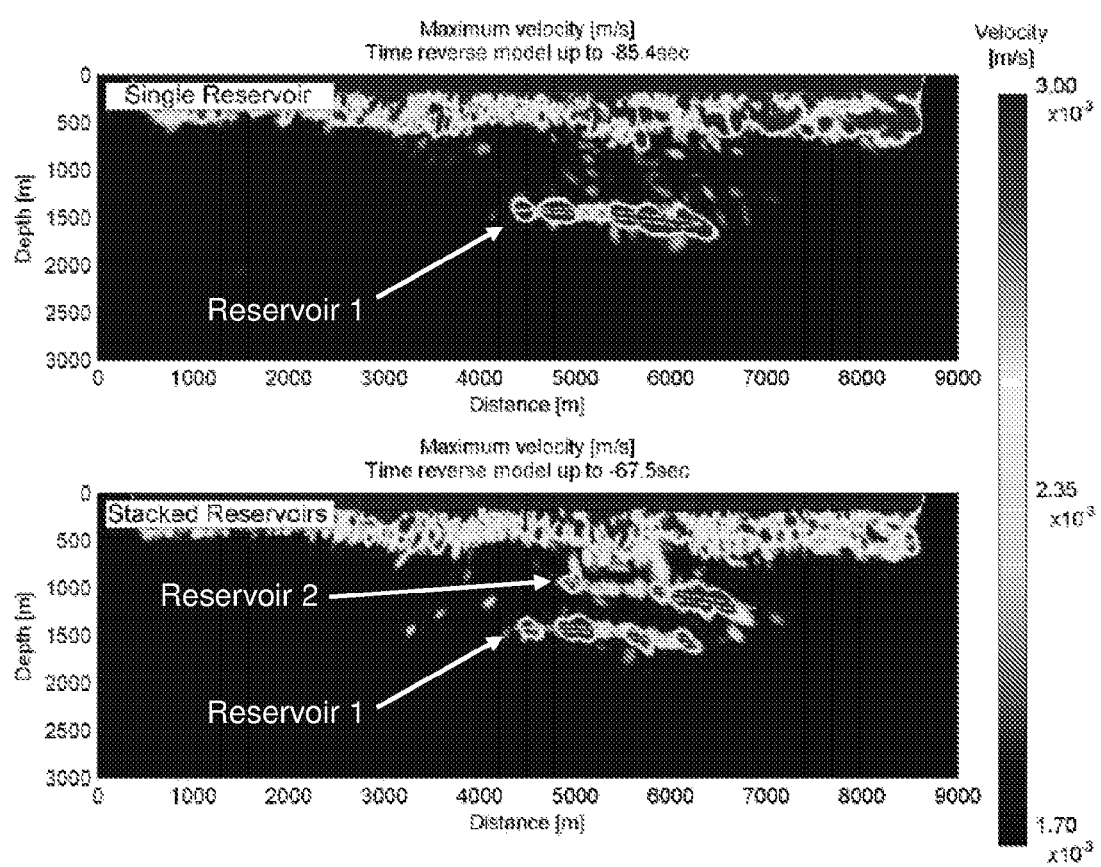
FIG. 7 illustrates maximum values of particle dynamic values plotted for determination of reservoir positions.

The area where the highest velocities occur during the reverse modeling delineates the area in which the point (reservoir) sources of the forward model were distributed is illustrated in FIG. 7. The accumulation of high velocities is dense enough to distinguish between the two stacked reservoirs. Microtremor reservoir sources in the subsurface can be localized with time reverse methods. Both models show a focus of high velocities in the area of the reservoirs, which are zones of microtremor sources in the forward models.

Figure 8A:
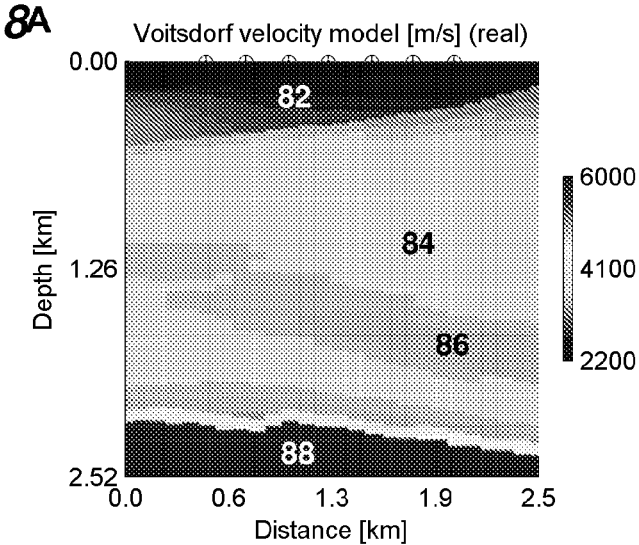
FIG. 8A illustrates a real input velocity model for reverse-time processing.
Figure 8B:
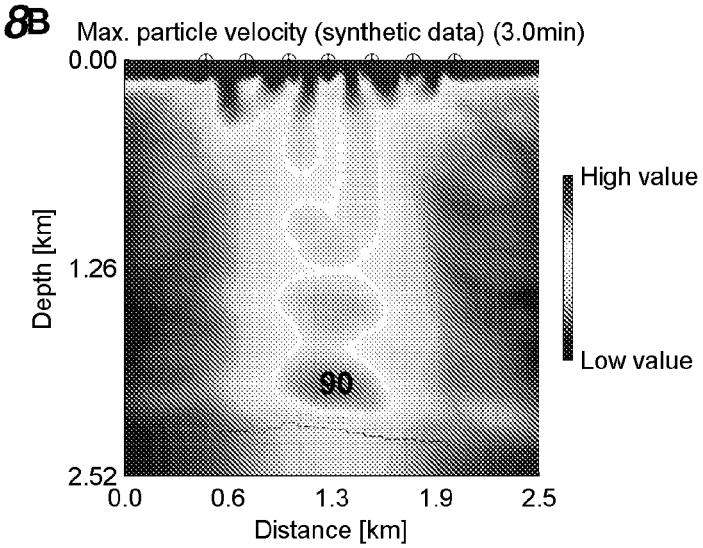
FIG. 8B illustrates a synthetic data example with the real velocity model of FIG. 8A showing that a reverse simulation of synthetic signals with source at the location of the assumed reservoir shows that the location of the source can be identified very well in this complex media.
Figure 8C:
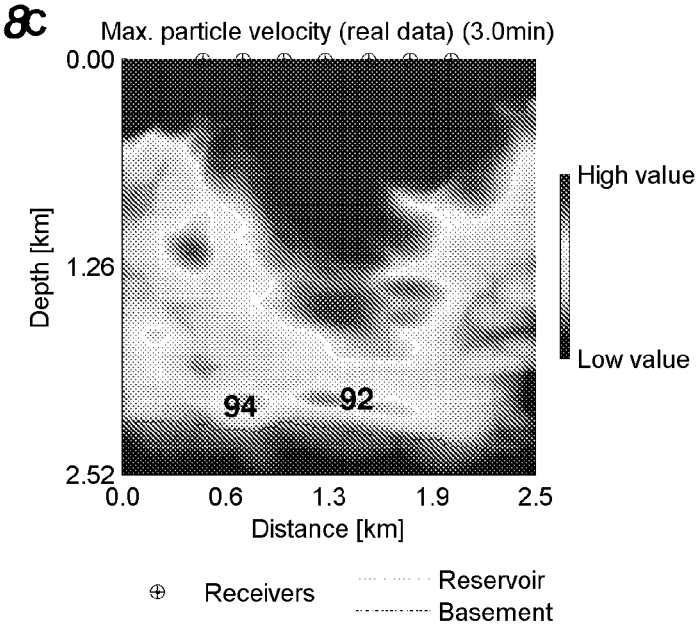
FIG. 8C illustrates reverse time migration with real field data output as maximum dynamic particle parameter (in this illustration, velocity) results with a reservoir location.

FIG. 8A is illustrative of a velocity structure model for a field area that in general consists of a low velocity top layer 82, a thick intermediate velocity layer 84 with low velocity contrast 86 relative to the top layer and a crystalline basement 88 of high velocity. FIG. 8B is illustrative of a reverse simulation of synthetic signals with source at the location 90 of the assumed reservoir shows that the location of the source can be identified very well in this complex media. FIG. 8C is illustrative of time reverse modeling with actual field data from the field area, which are 'passive' field measurement data that show a pattern similar to the synthetic example with reservoir locations 92 and 94.

In one non-limiting embodiment a method and system for processing synchronous array seismic data includes acquiring synchronous passive seismic data from a plurality of sensors to obtain synchronized array measurements. A reverse-time data process is applied to the synchronized array measurements to obtain a plurality of dynamic particle parameters associated with subsurface locations. These dynamic particle parameters are stored in a form for display. Maximum values of the dynamic particle parameters may be interpreted as reservoir locations. The dynamic particle parameters may be particle displacement values, particle velocity values, particle acceleration values or particle pressure values. The sensors may be three-component sensors. Zero-phase frequency filtering of different ranges of interest may be applied. The data may be resampled to facilitate efficient data processing.

Figure 9:
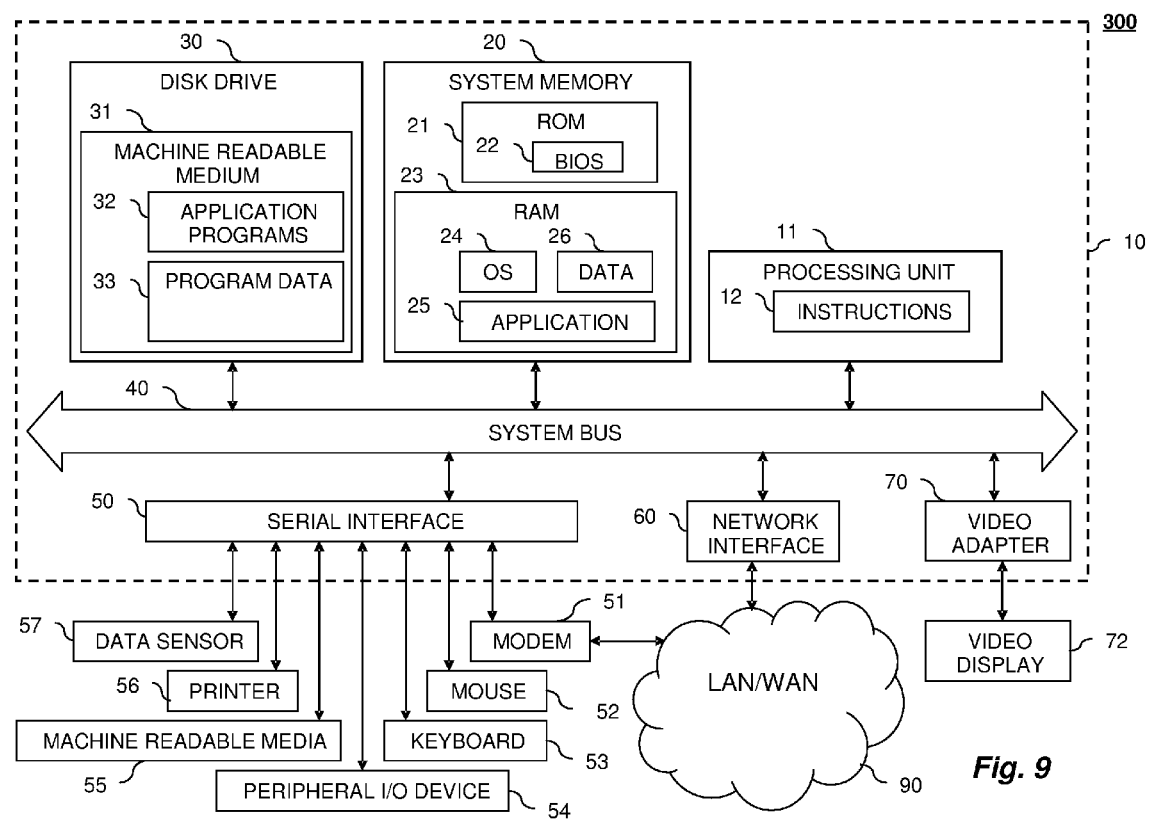
FIG. 9 is diagrammatic representation of a machine in the form of a computer system within which a set of instructions, when executed may cause the machine to perform any one or more of the methods and processes described herein.

FIG. 9 is illustrative of a computing system and operating environment for implementing a general purpose computing device in the form of a computer 10. Computer 10 includes a processing unit 11 that may include 'onboard' instructions 12. Computer 10 has a system memory 20 attached to a system bus 40 that operatively couples various system components including system memory 20 to processing unit 11. The system bus 40 may be any of several types of bus structures using any of a variety of bus architectures as are known in the art.

While one processing unit 11 is illustrated in FIG. 9, there may be a single central-processing unit (CPU) or a graphics processing unit (GPU), or both or a plurality of processing units. Computer 10 may be a standalone computer, a distributed computer, or any other type of computer.

System memory 20 includes read only memory (ROM) 21 with a basic input/output system (BIOS) 22 containing the basic routines that help to transfer information between elements within the computer 10, such as during start-up. System memory 20 of computer 10 further includes random access memory (RAM) 23 that may include an operating system (OS) 24, an application program 25 and data 26.

Computer 10 may include a disk drive 30 to enable reading from and writing to an associated computer or machine readable medium 31. Computer readable media 31 includes application programs 32 and program data 33.

For example, computer readable medium 31 may include programs to process seismic data, which may be stored as program data 33, according to the methods disclosed herein. The application program 32 associated with the computer readable medium 31 includes at least one application interface for receiving and/or processing program data 33. The program data 33 may include seismic data acquired according to embodiments disclosed herein. At least one application interface may be associated with calculating a ratio of data components, which may be spectral components, for locating subsurface hydrocarbon reservoirs.

The disk drive may be a hard disk drive for a hard drive (e.g., magnetic disk) or a drive for a magnetic disk drive for reading from or writing to a removable magnetic media, or an optical disk drive for reading from or writing to a removable optical disk such as a CD ROM, DVD or other optical media.

Disk drive 30, whether a hard disk drive, magnetic disk drive or optical disk drive is connected to the system bus 40 by a disk drive interface (not shown). The drive 30 and associated computer-readable media 31 enable nonvolatile storage and retrieval for application programs 32 and data 33 that include computer-readable instructions, data structures, program modules and other data for the computer 10. Any type of computer-readable media that can store data accessible by a computer, including but not limited to cassettes, flash memory, digital video disks in all formats, random access memories (RAMs), read only memories (ROMs), may be used in a computer 10 operating environment.

Data input and output devices may be connected to the processing unit 11 through a serial interface 50 that is coupled to the system bus. Serial interface 50 may a universal serial bus (USB). A user may enter commands or data into computer 10 through input devices connected to serial interface 50 such as a keyboard 53 and pointing device (mouse) 52. Other peripheral input/output devices 54 may include without limitation a microphone, joystick, game pad, satellite dish, scanner or fax, speakers, wireless transducer, etc. Other interfaces (not shown) that may be connected to bus 40 to enable input/output to computer 10 include a parallel port or a game port. Computers often include other peripheral input/output devices 54 that may be connected with serial interface 50 such as a machine readable media 55 (e.g., a memory stick), a printer 56 and a data sensor 57. A seismic sensor or seismometer for practicing embodiments disclosed herein is a nonlimiting example of data sensor 57. A video display 72 (e.g., a liquid crystal display (LCD), a flat panel, a solid state display, or a cathode ray tube (CRT)) or other type of output display device may also be connected to the system bus 40 via an interface, such as a video adapter 70. A map display created from spectral ratio values as disclosed herein may be displayed with video display 72.

A computer 10 may operate in a networked environment using logical connections to one or more remote computers. These logical connections are achieved by a communication device associated with computer 10. A remote computer may be another computer, a server, a router, a network computer, a workstation, a client, a peer device or other common network node, and typically includes many or all of the elements described relative to computer 10. The logical connections depicted in FIG. 9 include a local-area network (LAN) or a wide-area network (WAN) 90. However, the designation of such networking environments, whether LAN or WAN, is often arbitrary as the functionalities may be substantially similar. These networks are common in offices, enterprise-wide computer networks, intranets and the Internet.

When used in a networking environment, the computer 10 may be connected to a network 90 through a network interface or adapter 60. Alternatively computer 10 may include a modem 51 or any other type of communications device for establishing communications over the network 90, such as the Internet. Modem 51, which may be internal or external, may be connected to the system bus 40 via the serial interface 50.

In a networked deployment computer 10 may operate in the capacity of a server or a client user machine in server-client user network environment, or as a peer machine in a peer-to-peer (or distributed) network environment. In a networked environment, program modules associated with computer 10, or portions thereof, may be stored in a remote memory storage device. The network connections schematically illustrated are for example only and other communications devices for establishing a communications link between computers may be used.

While various embodiments have been shown and described, various modifications and substitutions may be made thereto without departing from the spirit and scope of the disclosure herein. Accordingly, it is to be understood that the present embodiments have been described by way of illustration and not limitation.

The invention claimed is:

1. A method for processing synchronous array seismic data comprising:
    a) acquiring seismic data from a plurality of sensors to obtain synchronized array measurements;
    b) selecting seismic data without reference to phase information of the seismic data;
    c) applying a reverse-time data process using a processing unit to the synchronized array measurements to obtain a dynamic particle parameter associated with a plurality of subsurface locations; and
    d) storing only a maximum value and discarding any other value, of the dynamic particle parameter associated with each of the plurality of subsurface locations.

2. The method of claim 1 wherein the maximum value of dynamic particle parameters is stored in a form for display.

3. The method of claim 1 wherein the plurality of dynamic particle parameters are at least one selected from the group consisting of i) particle velocity values, ii) particle acceleration values and iii) particle pressure values.

4. The method of claim 1 wherein the plurality of sensors are three-component sensors.

5. The method of claim 1 further comprising applying a zero-phase frequency filter to the synchronized array measurements.

6. The method of claim 1 further comprising resampling the synchronized array measurements.

7. The method of claim 1 further comprising an extrapolator selected from a group consisting of i) finite-difference reverse time migration, ii) ray-tracing reverse time migration and iii) pseudo-spectral reverse time migration.

* * * * *